July 12, 1932. A. DINA 1,866,549

MOVABLE APERTURE PLATE FOR MOTION PICTURE MACHINES

Filed Dec. 31, 1928 2 Sheets-Sheet 1

Inventor
Augusto Dina
By his Attorney

July 12, 1932. A. DINA 1,866,549
MOVABLE APERTURE PLATE FOR MOTION PICTURE MACHINES
Filed Dec. 31, 1928 2 Sheets-Sheet 2
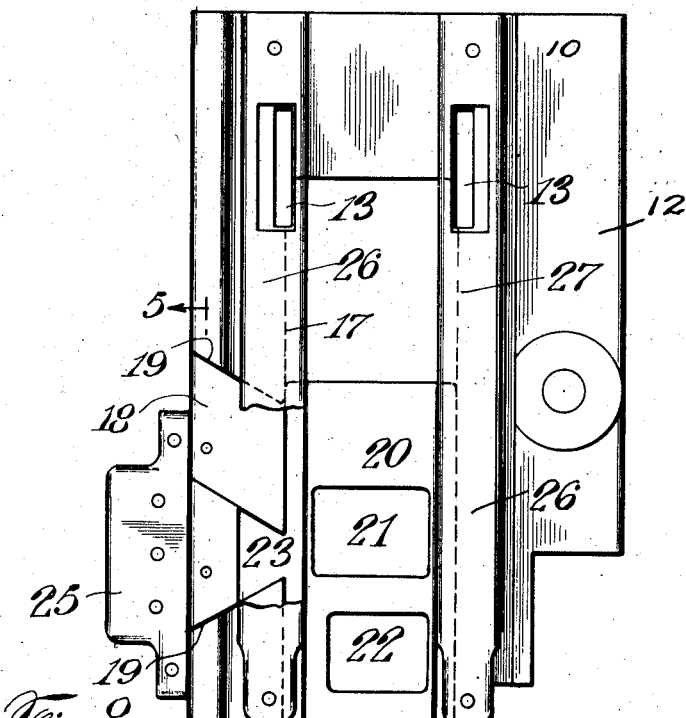
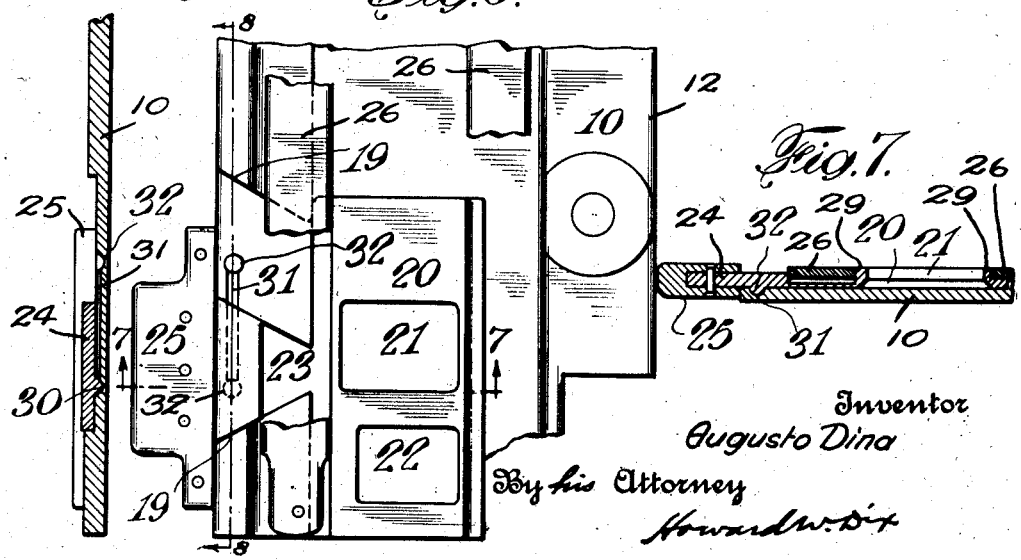
Inventor
Augusto Dina
By his Attorney Patented July 12, 1932

1,866,549

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

MOVABLE APERTURE PLATE FOR MOTION PICTURE MACHINES

Application filed December 31, 1928. Serial No. 329,335.

This invention relates to motion picture projection machines, and more particularly to a new and improved aperture plate therefor.

In operating motion picture projection machines it is frequently desirable to change the size of the aperture in order to project pictures from films having exposures of various sizes. This occurs particularly in sound pictures of the type in which the sound record is incorporated on a portion of the film adjacent the exposures. This necessitates the use of an exposure of less than normal size. It is accordingly necessary to change the size of the aperture in the aperture plate of the projection head to correspond with that of the exposure in order to completely shield the sound record from the light rays.

It is an object of the present invention to provide an aperture plate in which the size of the aperture may be varied with a minimum expenditure of time and labor.

Another object is to provide an adjustable aperture plate whereby the size of the aperture may be controlled substantially instantly and at the will of the operator.

A further object is to provide an adjustable aperture plate in the form of a compact assembly wherein variation in size of the aperture may be made without replacing or altering any of the parts.

These objects and others, which will be apparent as the nature of the invention is disclosed, are accomplished by providing a fixed backing plate or casting containing an aperture of sufficient size to admit light to the largest exposure. A slidable aperture plate having a plurality of apertures of various sizes is mounted on the casting and is adapted to be longitudinally moved with respect thereto whereby any desired aperture may be brought into operative position. Locking means is provided for securing the slidable plate when the desired aperture has been properly located. Means is also incorporated with the backing plate for properly aligning the slidable aperture plate and for insuring the correct location of the aperture with respect to the light rays.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a rear elevation of the aperture plate constructed in accordance with the present invention;

Fig. 4 is a front elevation showing the slidable plate;

Fig. 5 is a section taken on the line 5—5 of Fig. 4;

Fig. 6 is a front elevation of a modified form of plate;

Fig. 7 is a section on the line 7—7 of Fig. 6; and

Fig. 8 is a section on the line 8—8 of Fig 6.

Like reference characters refer to like parts in the several figures of the drawings.

Figure 1:
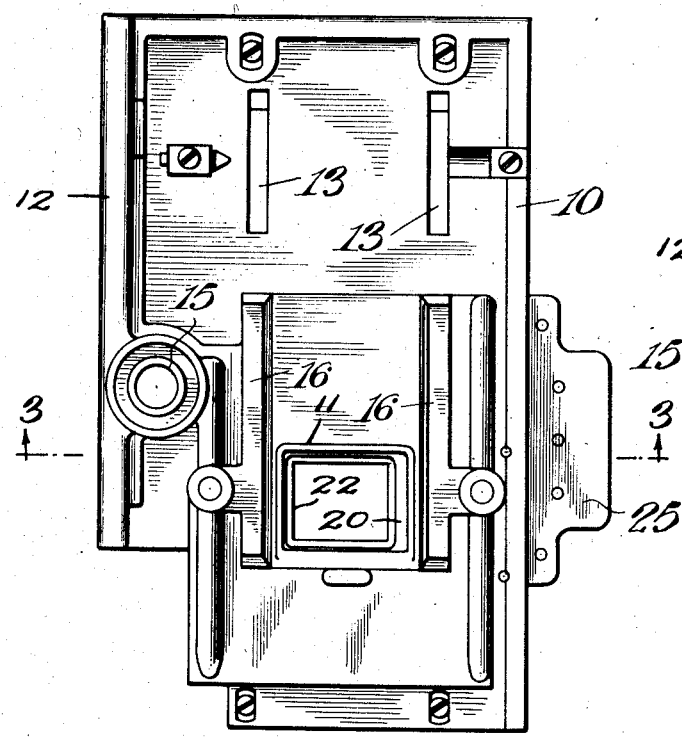
Figure 2:
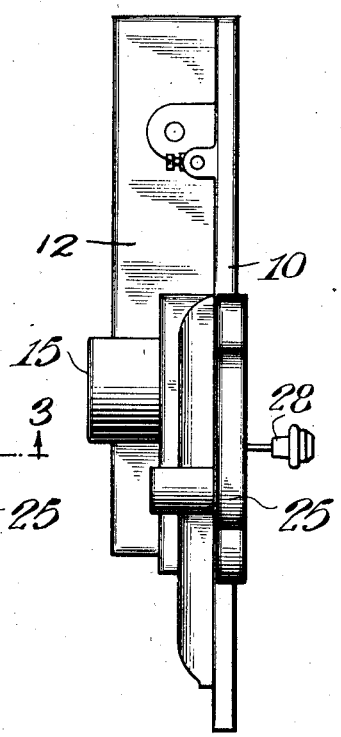
Fig. 2 is a side elevation thereof.

In the following description and in the claims parts will be identified by specific names for convenience, but they are intended to be as generic in their application to similar parts as the art will permit.

Referring to the drawings more in detail, the invention is shown as comprising a backing plate or casting 10 having a tapered aperture 11 therein through which the light rays are projected onto the picture film, and a flange 12 by means of which the plate may be supported. Plate 10 is also provided with a pair of slots 13 for receiving the film guide rollers which may be of any well known construction. An opening 15 may be provided to support a stationary rod on which the film gate (not shown) may be mounted. Plate 10 is also provided with a pair of channel members 16 in which the fire gate or other suitable apparatus is adapted to slide.

The face of plate 10 is preferably recessed as by longitudinal grooves 17 and 27 (Figs. 3 and 4), extending on opposite sides of aperture 11 and adapted to receive the slidable aperture plate as will be described. A tapered recess 18 (Fig. 4) is also provided plate 10 extending from recess 17 to the outer side of said plate and forming shoulders 19.

A slidable aperture plate 20 is provided with a plurality of apertures such as 21 and 22, and is adapted to slide in recesses 17 and 27 of plate 10. Slidable plate 20 is provided with an extension 23 terminating in a handle member 24 (Fig. 3) to which a handle 25 may be secured. Handle 25 may be formed of any desired heat-resisting material such as hard rubber or bakelite. The sides of extension 23 are tapered to correspond with shoulders 19 of recess 18 whereby the aperture plate 20 is drawn by the wedging action of said extension and shoulders toward the edge of recess 17. Film guides 26 are secured to plate 10 in a position overlying recesses 17 and 27 and forming in connection therewith grooves in which said slidable aperture plate 20 is adapted to slide.

Figure 3:
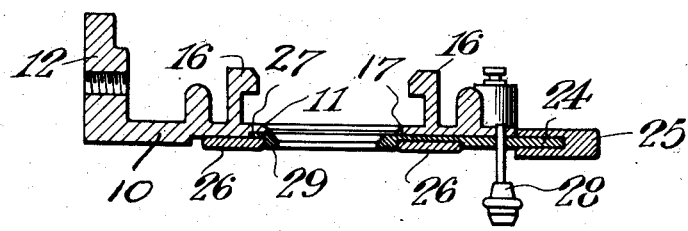
Fig. 3 is a section taken on the line 3—3 of Fig. 1.

Aperture plate 20 is provided with flanges 29 surrounding apertures 21 and 22, said flanges extending forwardly substantially flush with film guides 26. Apertures 21 and 22 are preferably tapered, as shown in Fig. 3 to correspond with the taper of aperture 11 in backing plate 10. For locking the slidable plate in its desired position, a pin 28 (Fig. 5) may be inserted in aligned holes in extension 23 and in the backing plate.

A modified form of locking member is disclosed in Figs. 6 to 8, in which the constructions of the backing plate and slidable aperture plate are similar to that shown in Figs. 1 to 5. Extension 23 of Fig. 6, however, is provided with a boss 30 (Fig. 8) which is adapted to slide in a longitudinal groove 31 formed in plate 10 and terminating in enlarged recesses 32 which cooperate with boss 30 for locking the same in its desired positions.

In the construction shown, an aperture 21 has been disclosed which is the full size of the standard exposure on a motion picture film. An aperture 22 has been disclosed of the proper size to display a reduced picture necessitated when a sound record is positioned on the film. It is obvious, however, that the sizes or shapes of these apertures may be varied as desired in accordance with the requirements of the particular case.

In operating an aperture plate of the type shown in Figs. 1 to 5, it is only necessary to remove locking pin 28 whereupon plate 20 may be slidably moved by handle 25 to the proper position for bringing the desired aperture in front of the aperture in the backing plate. In either its upper or its lower position, extension 23 will contact with shoulders 19 and wedge the aperture plate securely against the side of groove 17 thereby bringing the edge of the aperture 21 or 22 into its exact predetermined position. The assembly may then be locked by inserting pin 28 in the aligned holes.

In the modified form in Figs. 6 to 8, the aperture plate may be moved by exerting sufficient pressure upon handle 25 to withdraw boss 30 from its recess. The plate may then be moved to the opposite position wherein boss 30 will drop into the second recess and again secure the parts. The tapered extension and the shoulders operate in the manner previously pointed out for positively assuring the desired alignment.

It is to be noted that with an aperture plate of the above type the operator may change the size of the aperture in changing from one film to the next with substantially no loss of operating time. This feature is of particular importance where machines are to be used alternately for the projection of sound pictures and for the projection of motion pictures without sound.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. An adjustable aperture plate comprising a base plate having an aperture therein, longitudinal recesses in said base plate extending on opposite sides of said aperture and a tapered recess extending laterally from one of said longitudinal recesses, an aperture plate slidably movable in said longitudinal recesses and having a tapered handle extending laterally along said tapered recess, said taper being adapted to definitely locate said plate in a predetermined position.

2. An aperture plate for a motion picture projection machine comprising a base member having an aperture, means for supporting said member, an aperture plate slidably mounted therein, means for moving said aperture plate comprising a tapered handle extending laterally therefrom, and shoulders formed on said base plate and cooperating with said tapered handle for locating said plate in a predetermined position.

3. An aperture plate for a projection machine comprising a base member having an aperture and longitudinal recesses, a movable plate slidable in said recesses, film guides overlying said recesses to hold said plate in said recesses, said movable plate being provided with a plurality of apertures and having flanges surrounding said apertures and extending substantially flush with said film guides.

4. An adjustable aperture plate for a projection machine comprising a base member having a tapered aperture therein of sufficient size to transmit the largest desired picture, longitudinal recesses formed on said base member and extending on opposite sides of said aperture, a tapered transverse recess extending laterally from one of said longitudinal recesses to the side of said plate and forming tapered shoulders, a slidable aperture plate mounted in said recesses, said plate having a plurality of apertures of different sizes, a tapered handle extending laterally from said slidable plate and resting in said tapered recess, said handle being adapted to cooperate with said shoulders for drawing said slidable plate against the edge of one of said longitudinal recesses, and film guides longitudinally mounted on said base plate and overlying said longtiudinal recesses and the edges of said slidable plate for holding the same therein.

5. An adjustable aperture plate for a projection machine comprising a base member having a tapered aperture therein of sufficient size to transmit the largest desired picture, longitudinal recesses formed on said base member and extending on opposite sides of said aperture, a tapered transverse recess extending laterally from one of said longitudinal recesses to the side of said plate and forming tapered shoulders, a slidable aperture plate mounted in said recesses, said plate having a plurality of apertures of different sizes, a tapered handle extending laterally from said slidable plate and resting in said tapered recess, said handle being adapted to cooperate with said shoulders for drawing said slidable plate against the edge of one of said longitudinal recesses, and film guides longitudinally mounted on said base plate and overlying said longitudinal recesses and the edges of said slidable plate for holding the same therein, said slidable plate having flanges surrounding the apertures therein and extending forwardly substantially flush with said film guides.

6. An adjustable aperture plate for a projection machine comprising a base member having a tapered aperture therein of sufficient size to transmit the largest desired picture, longitudinal recesses formed on said base member and extending on opposite sides of said aperture, a tapered transverse recess extending laterally from one of said longitudinal recesses to the side of said plate and forming tapered shoulders, a slidable aperture plate mounted in said recesses, said plate having a plurality of apertures of different sizes, a tapered handle extending laterally from said slidable plate and resting in said tapered recess, said handle being adapted to cooperate with said shoulders for drawing said slidable plate against the edge of one of said longitudinal recesses, and film guides longitudinally mounted on said base plate and overlying said longitudinal recesses and the edges of said slidable plate for holding the same therein, said slidable plate having flanges surrounding the apertures therein and extending forwardly substantially flush with said film guides, said tapered handle and said base plate having aligned holes in the various operative positions to permit said elements to be located in said positions.

7. An adjustable aperture plate for a projection machine comprising a base member having a tapered aperture therein of sufficient size to transmit the largest desired picture, longitudinal recesses formed on said base member and extending on opposite sides of said aperture, a tapered transverse recess extending laterally from one of said longitudinal recesses to the side of said plate and forming tapered shoulders, a slidable aperture plate mounted in said recesses, said plate having a plurality of apertures of different sizes, a tapered handle extending laterally from said slidable plate and resting in said tapered recess, said handle being adapted to cooperate with said shoulders for drawing said slidable plate against the edge of one of said longitudinal recesses, a handle member of low heat conductivity secured to said tapered handle, and film guides longitudinally mounted on said base plate and overlying said longitudinal recesses and the edges of said slidable plate for holding the same therein, said slidable plate having flanges surrounding the apertures therein and extending forwardly substantially flush with said film guides, said tapered handle and said base plate having means for locking in the various operative positions.

8. An adjustable aperture plate for a projection machine comprising a base member having a tapered aperture therein of sufficient size to transmit the largest desired picture, longitudinal recesses formed on said base member and extending on opposite sides of said aperture, a tapered transverse recess extending laterally from one of said longitudinal recesses to the side of said plate and forming tapered shoulders, a slidable aperture plate mounted in said recesses, said plate having a plurality of apertures of different sizes, a tapered handle extending laterally from said slidable plate and resting in said tapered recess, said handle being adapted to cooperate with said shoulders for drawing said slidable plate against the edge of one of said longitudinal recesses, a handle member of low heat conductivity secured to said tapered handle, and film guides longitudinally mounted on said base plate and overlying said longitudinal recesses and the edges of said slidable plate for holding the same therein, said slidable plate having flanges surrounding the apertures therein and extending forwardly substantially flush with said film guides, said tapered handle and said base plate having aligned holes in the various operative positions to permit said elements to be located in said positions.

AUGUSTO DINA.